(12) United States Patent
Wu

(10) Patent No.: US 6,725,547 B2
(45) Date of Patent: Apr. 27, 2004

(54) GARDENING SHEARS

(75) Inventor: Shih-Piao Wu, Chang Hua Hsien (TW)

(73) Assignee: Jiin Haur Industrial Co., Ltd., Chang Hua Hsien (TW)

( * ) Notice: Subject to any disclaimer, the term of this patent is extended or adjusted under 35 U.S.C. 154(b) by 127 days.

(21) Appl. No.: 09/933,448

(22) Filed: Aug. 21, 2001

(65) Prior Publication Data

US 2002/0066188 A1 Jun. 6, 2002

(30) Foreign Application Priority Data

Dec. 4, 2000 (TW) ...................................... 89220995 U

(51) Int. Cl.[7] ............................................... B26B 13/26
(52) U.S. Cl. .............................. 30/254; 30/261; 30/262
(58) Field of Search .......................... 30/254, 261, 262, 30/244, 245, 250, 251, 252

(56) References Cited

U.S. PATENT DOCUMENTS

| | | | | |
|---|---|---|---|---|
| 838,504 A | * | 12/1906 | Hammond | 30/262 |
| 1,748,701 A | * | 2/1930 | Boyd | 30/349 |
| 2,295,385 A | * | 9/1942 | Connors | 30/262 |
| 4,809,433 A | * | 3/1989 | Maxwell et al. | 30/254 |
| 5,263,254 A | * | 11/1993 | Orthey | 30/254 |
| 5,483,747 A | * | 1/1996 | Thompson et al. | 30/254 |
| 6,260,277 B1 | * | 7/2001 | Wu | 30/232 |
| 6,453,561 B1 | * | 9/2002 | Chou | 30/266 |

* cited by examiner

*Primary Examiner*—Stephen Choi
(74) *Attorney, Agent, or Firm*—Harrison & Egbert

(57) ABSTRACT

A pair of gardening shears include a blade fastened to one end of a first handle, and a fixed jaw plate fastened to one end of a second handle which is pivotally fastened to the first handle by a pivoting member. The pivoting member is formed of a pivot and a nut which is engaged with the pivot and is positioned by a locating plate. The nut is provided with a toothed portion. The locating plate is provided with a toothed portion which is engaged with the toothed portion of the nut. The fixed jaw plate is provided with a recessed edge which is opposite in location to the blade and is intended to reduce friction between the fixed jaw plate and the blade.

3 Claims, 5 Drawing Sheets

GARDENING SHEARS

BACKGROUND OF THE INVENTION

1. Field of the Invention

The present invention relates generally to a pair of gardening shears, and more particularly to a pair of gardening shears which are provided with means to prevent the deposit of twigs between a movable blade and a fixed jaw plate of the gardening shears, and means to fix securely a pivoting joint so as to bring about effectively the scissors action of the gardening shears.

2. Description of Related Art

As shown in FIG. 1, a pair of gardening shears of the prior art comprise a first handle 11, a second handle 13, a movable blade 10 fastened at one end of the first handle 11, a fixed jaw 12 fastened at one end of the second handle 13, and a pivot 14 for fastening pivotally the movable blade 10 and the fixed jaw 12 in conjunction with a nut 15 and a pad 16. A locating knob 17 is pivoted to the first handle 11 and is provided with a stop edge 18. The nut 15 is provided with a toothed periphery 20 for engaging the teeth 21 of a toothed piece 19, so as to fix the nut 15. The fixed jaw 12 has a smooth planar side 22 opposite in location to the movable blade 10.

The gardening shears of the prior art described above are defective in design because the toothed piece 19 is made by a special molding tool at an additional production cost, and because the toothed piece 19 is not effective in positioning the nut 15. In addition, the locating knob 17 is not strong enough to withstand the pressure for a prolonged period of time, thereby undermining the service life span of the prior art gardening shears. In light of the friction between the planar side 22 of the fixed jaw 12 and the movable blade 10, the twigs are apt to deposit between the blade 10 and the planar side 22 of the fixed jaw 12, thereby resulting in the jamming of the blade 10 and the fixed jaw 12.

BRIEF SUMMARY OF THE INVENTION

The primary objective of the present invention is to provide a pair of gardening shears which are free of the shortcomings of the prior art gardening shears described above.

The foregoing objective of the present invention is achieved by the gardening shears comprising a blade and a fixed jaw plate fastened pivotally to the blade by a pivot in conjunction with a nut and a locating plate for positioning the nut. The fixed jaw plate is provided with a recessed edge serving to abate friction between the blade and the fixed jaw plate.

The features and the functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
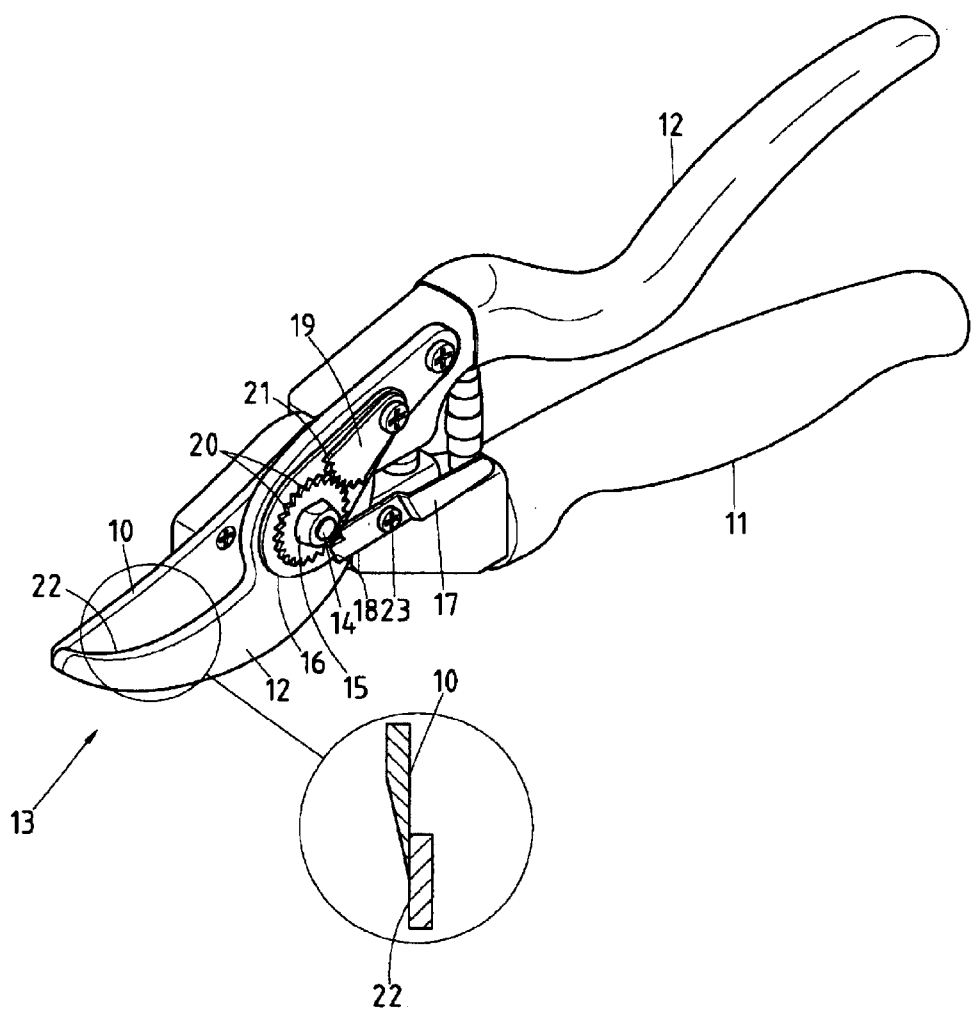
FIG. 1 shows a perspective view of a pair of gardening shears of the prior art.
Figure 2:
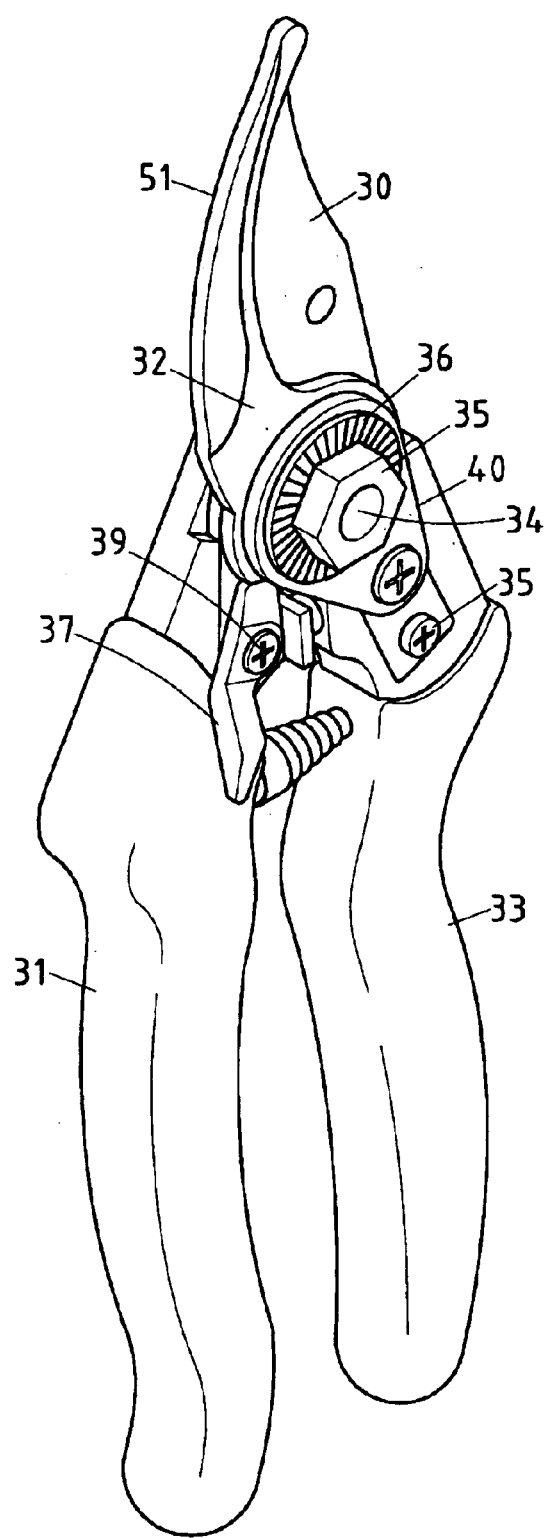
FIG. 2 shows a perspective view of a pair of gardening shears of the preferred embodiment of the present invention.
Figure 3:
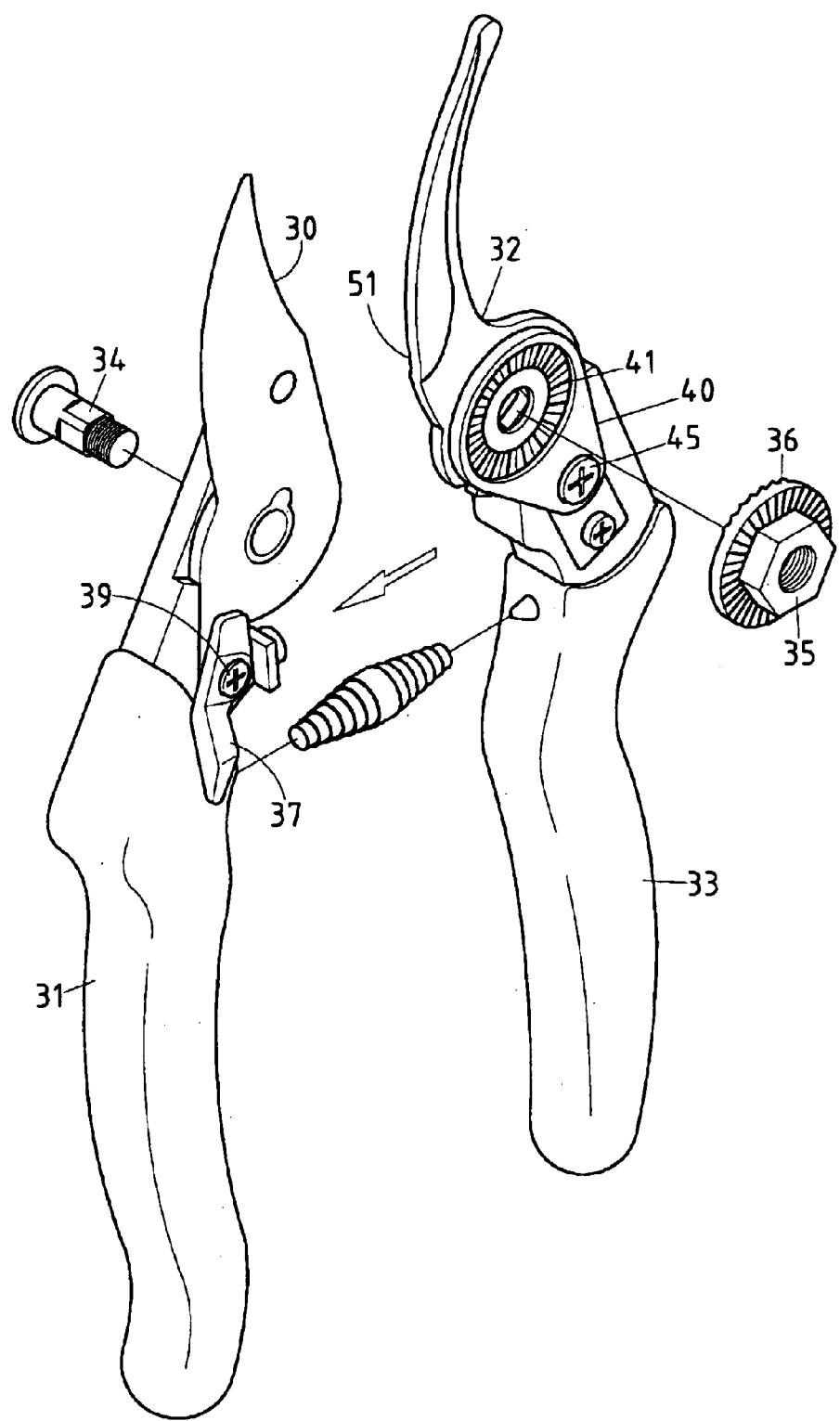
FIG. 3 shows a partial exploded view of the preferred embodiment of the present invention.
Figure 4:
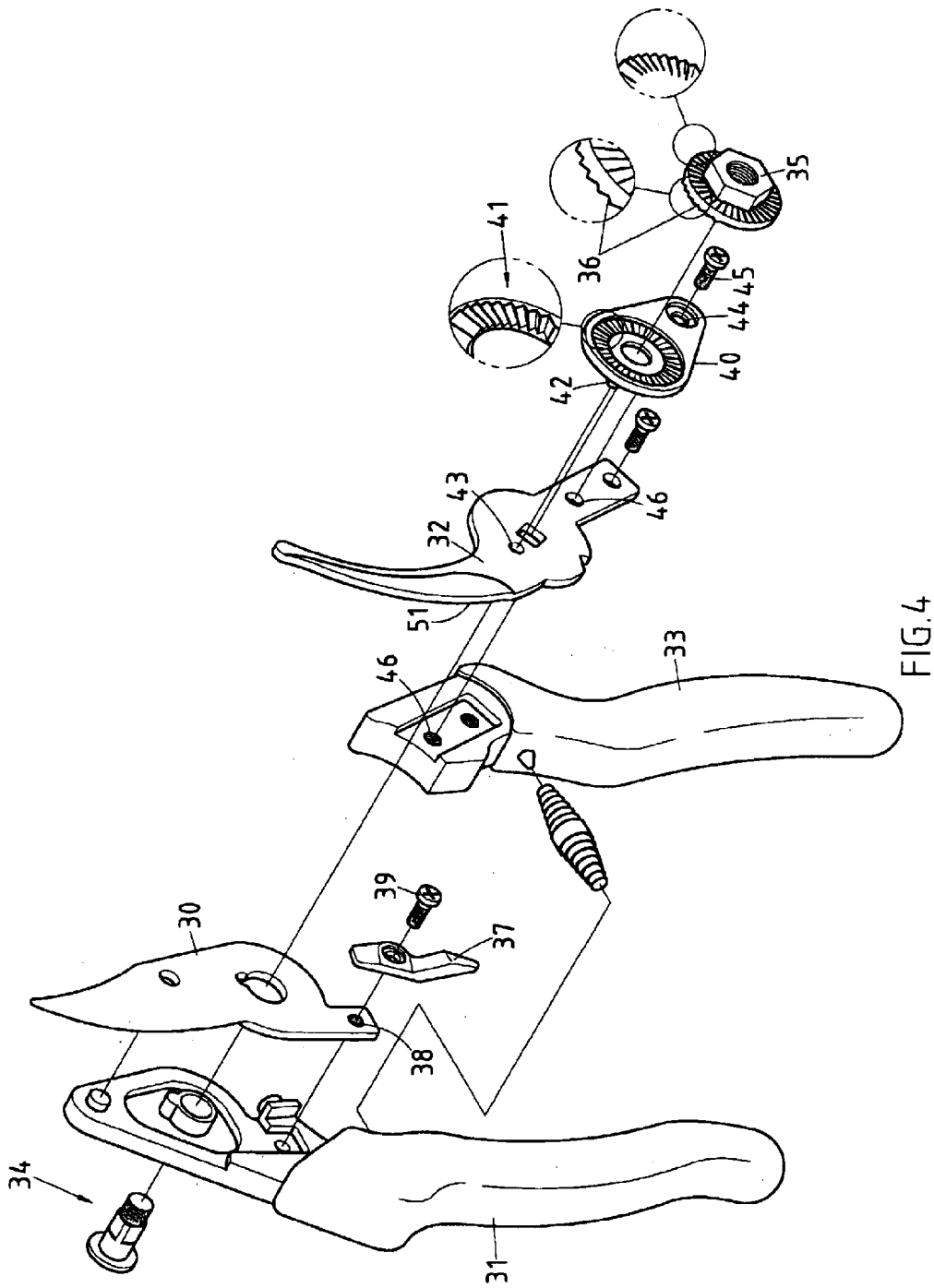
FIG. 4 shows a complete exploded view of the preferred embodiment of the present invention.
Figure 5:
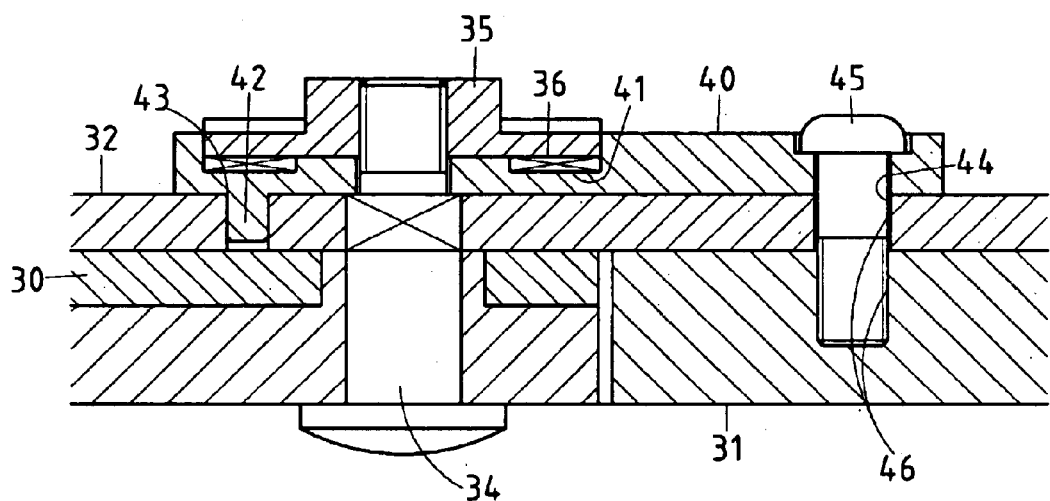
FIG. 5 shows a sectional view of a pivoting joint of the preferred embodiment of the present invention.
Figure 6:
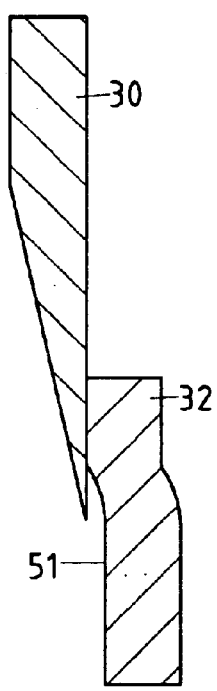
FIG. 6 shows a sectional schematic view of the blade and the fixed jaw plate of the preferred embodiment of the present invention.

As shown in FIGS. 2–6, a pair of gardening shears of the preferred embodiment of the present invention comprise a blade 30 fastened at one end of a first handle 31, a fixed jaw plate 32 fastened at one end of a second handle 33, and a pivoting member formed of a pivot 34, a nut 35 and a locating plate 40.

The blade 30 is provided with a threaded hole 38 and a locating knob 37 which is fastened along with the blade 30 to the first handle 31 by a fastening bolt 39 that is engaged with the threaded hole 38.

The fixed jaw plate 32 is provided with a locating hole 43 and a fastening hole 46. The fixed jaw plate 32 is fastened along with the pivoting member to the second handle 33 such that the fixed jaw plate 32 is fastened pivotally to the blade 30 by the pivot 34 which is engaged with the nut 35 via the locating plate 40. The locating plate 40 is fastened to the fixed jaw plate 32 and the second handle 33 by a fastening bolt 45 which is engaged with a fastening hole 46 of the second handle 33 via a fastening hole 46 of the fixed jaw plate 32 and a through hole 44 of the locating plate 40. The locating plate 40 is provided in the inner side with a locating projection 42 which is received in locating hole 43 of the fixed jaw plate 32. The locating plate 40 is provided in the outer side with a toothed portion 41. The nut 35 is provided in the inner side with a toothed portion 36 which is engaged with the toothed portion 41 of the locating plate 40. As a result, the nut 35 is securely positioned by the locating plate.

The fixed jaw plate 32 is provided with a recessed edge 51 which is opposite in location to the blade 30 for abating friction between the fixed jaw plate 32 and the blade 30, so as to prolong the service life span of the blade 30.

The preferred embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following claims.

I claim:

1. A pair of gardening shears comprising:
   a first handle;
   a blade affixed to one end of said first handle;
   a locating knob fastened to said blade and to said first handle at said one end of said first handle;
   a second handle having a fastening hole formed therein;
   a fixed jaw plate fastened to one end of said second handle, said fixed jaw plate having a fastening hole formed therein;
   a pivot mechanism pivotally connecting said first handle and said second handle, said pivot mechanism comprising a pivot and a locating plate and a nut, said pivot pivotally fastening said first handle and said second handle and said locating plate, said nut secured to said pivot such that said blade and said fixed jaw plate are opposite to each other, said pivot extending through said locating plate so as to engage said nut, said locating plate having a toothed portion at an outer side thereof and a locating hole spaced outwardly from said toothed portion, said nut having a toothed portion formed on an inner side thereof, said toothed portion of said nut engaged with said toothed portion of said locating plate, said locating plate fastened to said fixed jaw plate and to said second handle by a fastening bolt engaged with said fastening hole of said second handle and extending through said fastening hole of said fixed jaw plate and said locating hole of said locating plate.

2. The pair of gardening shears of claim 1, said locating plate having a locating projection extending from an inner side thereof, said fixed jaw plate having a locating hole formed in an outer side thereof, said locating hole receiving said locating projection therein.

3. The pair of gardening shears of claim 1, said fixed jaw plate having a recessed edge opposite in location to said blade.

* * * * *